(12) United States Patent
Gunzert et al.

(10) Patent No.: US 7,225,084 B2
(45) Date of Patent: May 29, 2007

(54) MEASURING DEVICE FOR A PROCESS TECHNOLOGY

(75) Inventors: Michael Gunzert, Talheim (DE); Detlev Wittmer, Maulbronn (DE)

(73) Assignee: Endress + Hauser Conducta GmbH + Co. KG, Gerlingen (DE)

( * ) Notice: Subject to any disclaimer, the term of this patent is extended or adjusted under 35 U.S.C. 154(b) by 0 days.

(21) Appl. No.: 10/510,234

(22) PCT Filed: Apr. 11, 2003

(86) PCT No.: PCT/EP03/03760

§ 371 (c)(1),
(2), (4) Date: Jun. 3, 2005

(87) PCT Pub. No.: WO03/087965

PCT Pub. Date: Oct. 23, 2003

(65) Prior Publication Data

US 2005/0222780 A1  Oct. 6, 2005

(30) Foreign Application Priority Data

Apr. 13, 2002 (DE) .............................. 102 16 331

(51) Int. Cl.
*G06F 19/00* (2006.01)

(52) U.S. Cl. .......................... 702/30; 702/22; 702/32; 702/189; 204/433; 204/194; 204/400; 324/435; 600/309; 435/287.1

(58) Field of Classification Search .................. 702/22, 702/30, 32, 189; 204/433, 194, 400; 324/435; 600/309; 435/287.1

See application file for complete search history.

(56) References Cited

U.S. PATENT DOCUMENTS

| 4,436,610 | A | * | 3/1984 | Enzer et al. ................. 204/400 |
| 4,774,956 | A | * | 10/1988 | Kruse et al. ................. 600/350 |
| 5,507,936 | A | * | 4/1996 | Hatschek et al. ........... 204/412 |
| 5,766,432 | A | * | 6/1998 | Dunn et al. ................. 204/412 |

FOREIGN PATENT DOCUMENTS

DE       198 50 122 A1    10/1999

OTHER PUBLICATIONS

Ahn, 'Comprehensive Oceanographic Monitoring Program in the Arabian Golf', 1980, IEEE Publication, pp. 674-677.*
Ion Industrial, 'Intelligent Static Neutralizers with Fieldbus Interface for Industrial Networks', Jan. 2000, specification sheet, Version 2.0, pp. 1-2.*
Sensorsignalverarbeitung, p. 203.

* cited by examiner

*Primary Examiner*—Marc S. Hoff
*Assistant Examiner*—Elias Desta
(74) *Attorney, Agent, or Firm*—Bacon & Thomas PLLC

(57) ABSTRACT

A measuring device for process technology, useful in measuring- and/or cleaning- and/or calibration-installations in the field of process automation for measuring pH-values and/or redox potentials and/or other process parameters, and an operating method therefor. The measuring device includes at least one central unit having at least one central computer, wherein, in the central computer a management system is provided for the dynamic management of input components (I) and/or output components (O) and/or functional components (F) and/or service components (D) and/or management components (V) and/or interface components (IX) and/or other system components.

15 Claims, 1 Drawing Sheet

MEASURING DEVICE FOR A PROCESS TECHNOLOGY

FIELD OF THE INVENTION

The present invention relates to a measuring device for process technology useful in measuring- and/or cleaning- and/or calibration-installations in the field of process automation for measuring pH-values and/or redox potentials and/or other process parameters. The device includes at least one central unit, which has at least one central computer.

The present invention also relates to an operating method for a measuring device for process technology useful in measuring- and/or cleaning- and/or calibration-installations in the field of process automation for measuring pH-values and/or redox potentials and/or other process parameters. The device includes at least one central unit, which has at least one central computer.

BACKGROUND OF THE INVENTION

Conventional measuring devices frequently include a microprocessor control, which monitors process flow and processes measured values. However, this type of control is very inflexible, since, as a rule, significant effort is required, in order e.g. to replace the software of the microprocessor control or to expand the functionality of the device in other directions.

Usually, a program memory of the microprocessor control must be exchanged, or the program memory must—possibly in the field—at least be written over. Moreover, an adaptation of the software requires, almost independently of the scope of the changes, the expensive knowledge of specialists and, beyond that, much time.

SUMMARY OF THE INVENTION

In view of this, it is an object of the present invention to develop a measuring device of the above-named type and a corresponding operating method therefor further, such that a simpler and more economical adaptation of the measuring device to inherently changing demands is possible.

This object is achieved according to the invention for a measuring device of the above-named type thereby, that there is provided in the central computer a management system for the dynamic management of input components and/or output components and/or functional components and/or service components and/or management components and/or interface components and/or other system components.

The management system works in conjunction with an operating system of the central computer and uses services provided by the operating system. Thereby, it is, in principle, possible to design the management system independently of the architecture of the central computer, in so far as the operating system provides the access to all hardware components of the central computer needed by the management system.

It is also possible that the management system is integrated into the operating system of the central computer. Alternatively thereto, it is likewise possible that the management system uses services of the operating system and, parallel thereto, itself accesses hardware components of the central computer.

Quite generally, the management system can be stored in a program memory of the central computer. The program memory can, here, be in the form of a fixed memory, i.e. ROM, or also a re-writable Flash/EEPROM memory.

Usually the management system, as well as the operating system, are stored in an area of the program memory of the central computer specially reserved therefor and are re-written into the program memory only in the case of a software update or the like.

The management system assigns data processed by the central computer, or data which needs only to be forwarded, to the system components provided therefor in a manner yet to be explained. Such data can be, for example, measurement data from sensors.

In this case, the management system, in conjunction with use of the system components, represents, in an especially advantageous manner, an abstract plane between physical signals, such as e.g. sensor signals, and the central computer itself.

In this way, the necessity for adapting the application programs running on the central computer to special hardware components is avoided. For example, an application program in the case of the present invention does not need any special program code for activating a sensor connected to the central computer, in order to obtain corresponding measured values from the sensor.

The activating of the sensor and the read-out of measured values occurs in the case of the measuring device of the invention, using the management system for the system components, in such a way that a special system component, namely an input component, is assigned to the sensor. This input component, on the one hand, contains special information for the activating of the sensor, and, on the other hand, has a system interface within the management system. The measured values of the sensor can be forwarded to other system components, such as e.g. output components, through this interface. In this way, the application program does not need to be adapted, when e.g. another sensor is used. Only the corresponding input component needs to be adapted.

The system interface of a system component can, for example, be a range of memory in the central computer, accessible both by the management system and also by one or more other system components. The range of memory can, for example, be organized as a stack memory.

In the following explanations, the term "connection" is used for indicating quite generally a data exchange between system components, such as e.g. input and output components with one another by means of the management system and between system components and other components of the central computer. A connection can be implemented with the help of the system interface; there are, however, other techniques possible for a data exchange in the sense of a connection.

Via appropriate interface components, the management system enables the transfer of data through interfaces to users of the measuring device or also to other devices, e.g. other measurement devices. Also, the interface components have, for this purpose, a system interface for the exchange of data in the, or by the, management system.

Furthermore, the interface components have interface-specific information, in order to activate the interface hardware of the central computer directly, or in order, if necessary, to invoke services made available by the operating system for the use of the interfaces.

Input components can, for example, be used for the read-in of data at digital or analog inputs of the central computer. Output components can, correspondingly, be used, for example, for activating digital or analog outputs of the central computer, or actors, or actuators, connected thereto.

The management system enables, in simple manner, the integration of the most varied of assemblies and hardware components into the measuring device of the invention, wherein the adaptation at the programming level occurs in the form of the system components.

The management system can dynamically connect system components, so that an adapting of the functionality of the measuring device, which depends essentially on the functional complexity of the operating programs located in the programming memory of the central computer, is possible simply.

If, for instance, a new sensor is connected to the measuring device, then it is merely necessary to instantiate the input component already present in the device, out of the existing set of input components, and to connect with other system components, as needed, by means of the management system.

Dynamic signifies in this context that system components can be connected to, or also disconnected from, one another, during the operation of the central computer, or at least then, when an application program is already located in the central computer. It is, consequently, possible to configure the measuring device anew, without having to write the entire program memory of the central computer anew.

A very efficient possibility for integrating new hardware components, such as e.g. A/D converters or the like, is to test during the starting of the measuring device all interfaces and inputs, respectively outputs, of the central computer for the presence of sensors or other hardware components, and to assign to the hardware components found thereby the appropriate system components, thus e.g. input or output components. Expediently, there are for this purpose already a number of system components in the program memory of the central computer for access, as the need arises.

It is also possible to provide different forms of embodiment of the measuring devices during manufacture with different numbers of system components. For example, measuring devices of small scope of functionality and little program memory can be equipped with only few system components; larger devices with more program memory can already receive during manufacture very many system components, which enable a very flexible adapting to changing requirements.

Functional components are provided in the management system for the computational processing of measurement or regulating quantities. These functional components usually possess at least one input and one output and serve for implementing functional relationships between the data lying on the input(s) and the data presented on the output(s). For example, it is possible to implement mathematical functions with the functional components. Additionally, functional components can also contain (state-)memories and then work essentially as state automata, whereby also complex systems, such as e.g. filters of higher order, can be realized.

Functional components can be connected by the management system, for example, with input components and/or with output components or further system components. As already addressed, the term "connect", also "bind" or "link", in this context means that system components can exchange data over a system interface, such as e.g. shared memory areas in the form of a stack memory or the like.

In this way, it is possible to apply mathematical functions, such as, for example, an average value forming, or a rounding, to sensor data provided by input components and to forward the results, e.g. by means of output components, to actors or actuators. Likewise, it is possible using an appropriate functional component also to filter signals.

Especially, a development, also, of user-specific functions is possible, such being integrated into the measuring device in the form of user-specific functional components. Especially beneficial herein is that a change of an application program already running on the central computer is not required. The management system can connect the user-specific functional component also in the same way as other system components.

Usually, the system components have parameters, for example for the identification of components or also for the control of the signal, or data, processing in the functional components. The parameters are organized by a parameter management system, which is provided in the management system of the central computer.

The parameter management system resolves dependencies between parameters in different components. To do this, it is necessary that system components that use parameters record these parameters in the parameter management system.

A further, advantageous form of embodiment of the measuring device of the invention is characterized in that the management system has means for error recognition and/or error handling, which, for example, monitor the utilization of the memory areas assigned to the system components, or their instances.

Very advantageous is also a communications interface which is preferably provided in the central computer and which interacts with an interface component of the management system. The communications interface is, for example, provided in the form of a field bus interface.

It is also possible to design a communications interface differently, by parameterizing, or definition, of special functional components, which interact with an interface component, and, in this way, adapt to different standards. For example, using this technique, also digital outputs of the central computer can be provided with the functionality of a communications interface.

Very expedient for data exchange between the management system, or its interface components, and a communications interface is, in this case, the use of so-called dual-port-RAM memories, thus memories, which operate using two separate read/write interfaces. A synchronization between the management system and the communications interface is achievable in this case by the use of semaphores.

A further, very advantageous form of embodiment of the present invention is characterized in that a user interface is provided, over which data can be displayed by means of display elements, or over which a user can operate or also configure the measuring device using an input device. An example of a display element is a liquid crystal display. Process technology also includes contact-sensitive display elements, such as e.g. so-called "touch panels, which can be very helpful.

A further, flexible solution of the invention is characterized in that the communications interface includes an integrated web-server. The integrated web-server can furnish data of the measuring device in the widely adopted HTML (hypertext markup language) format. A personal computer, or a notebook computer, can, with a web-browser, display, or store, data furnished from the measuring device.

Very advantageous also is another form of embodiment of the present invention, such being characterized in that the user interface includes a web-browser.

The user interface can then display data furnished from the communications interface in HTML-format. It is not necessary to format data to be issued via the user interface on a display element of the measuring device in some manner of formatting different from that possessed by the data which is transmitted via a communications interface for utilization in other devices, such as e.g. a notebook computer. In particular, it is not necessary to prepare the data in the measuring device for issue in plural formats, in order e.g. that it fit the size of the display elements, because the HTML-format already offers suitable formatting options.

A further development of this idea provides that the communications interface is equipped with a radio communications interface, e.g. for a mobile radio network system. Building on this idea, it is also possible to forward the report of process conditions over the short message systems (SMS) widely used in the mobile radio networks. A further possibility for wireless connection of the measuring device is the use of radio transmission equipment working on the de facto standard, Bluetooth.

A further, especially advantageous form of embodiment of the method of the invention is characterized in that the execution of application programs on the central computer can be managed by the management system with the help of the management components. In this way, it is possible to invoke application programs contained in the program memory of the central computer also from functional or other system components. In this way, especially so-called callback mechanisms can be implemented, which enable an interaction of application programs with system components, without requiring an application program itself to access a system component. Such callback mechanisms are especially well suited for invoking application programs in reaction to the changing of a sensor signal or the like.

As a further solution of the object of the present invention, an operating method is provided for a measuring device for process technology for use in measuring and/or cleaning and/or calibration installations in the area of process automation, for measuring pH-values and/or redox potentials and/or other process parameters, with at least one central unit, which has at least one central computer, wherein in the central computer a management system dynamically manages input components and/or output components and/or functional components and/or service components and/or management components and/or interface components and/or other system components.

Especially advantageous is an operating method, wherein system components, preferably using a development environment, are specified and/or selected and/or configured and/or connected, or bound, together, before they are transferred to the central computer.

The method of the invention enables a development of system components on a development system specially provided therefor in a development environment adapted therefor.

This development environment can, for example, provide means for the graphical programming of the system components, or the connections, or bindings, between the system components. It is also possible therein to utilize libraries containing frequently used system components, or information about connections, or bindings.

In this way, the program code required for the system components can be efficiently re-used, whereby the total development process of a measuring device of the invention becomes more economical. Finally, the system components and the information about connections can be transferred into the central computer, where they are utilized by the management system.

Especially advantageous in this solution is the possibility of being able to effect connections and/or interconnections during operation of the device of the invention. The configuration of the measuring device can be accomplished, without having to shut the measuring device completely down or having to place it in a special operating state.

A further advantageous variant of the operating method of the invention provides that system components, during operation of the measuring device, are transferred into the central computer and/or are bound-in, or linked, by the management system, or are connected with other system components. This can be done, for example, by transferring the corresponding program code of the components into a free area of the program memory of the central computer provided for these purposes. In this way, a further possibility obtains for expanding the functionality of the measuring device during its operation.

A further embodiment of the operating method of the invention provides that system components are bound-in permanently in the central computer and that, for configuring the measuring device, information about the connection, or binding, of the system components by the management system is evaluated.

In the case of this variant, elementary system components, such as e.g. input and output components, which represent input and output means already physically present in the central computer, such as e.g. digital inputs and outputs and analog inputs and outputs, or input/output components for certain sensor/actuator modules, are already in the program memory of the central computer. Additionally, e.g. plural functional components, which, for example, represent elementary mathematical functions, are already present in the program memory of the central computer. For configuring the already-present system components, desired connections, or bindings, are defined e.g. with the aid of a development environment and subsequently transferred into the central computer, where the information about the connections are evaluated by the management system and the corresponding connections are established.

A further, very advantageous form of embodiment of the operating method of the invention is characterized in that the information concerning the connection of the system components is transferred from a first measuring device to other measuring devices. In the same way, also system components can be transferred from one measuring device to another measuring device.

Further features, possibilities of application and advantages of the invention will follow from the subsequent description of examples of embodiments of the invention illustrated in the figure of the drawing. Therein, all described or illustrated features, whether alone or in any combination, form the subject matter of the invention, independently of their summarization in the patent claims or the examples in which they were presented, as well as independently of their formulation, respectively illustration, in the description, respectively in the drawing.

DESCRIPTION OF THE PREFERRED EMBODIMENTS

Figure 1:
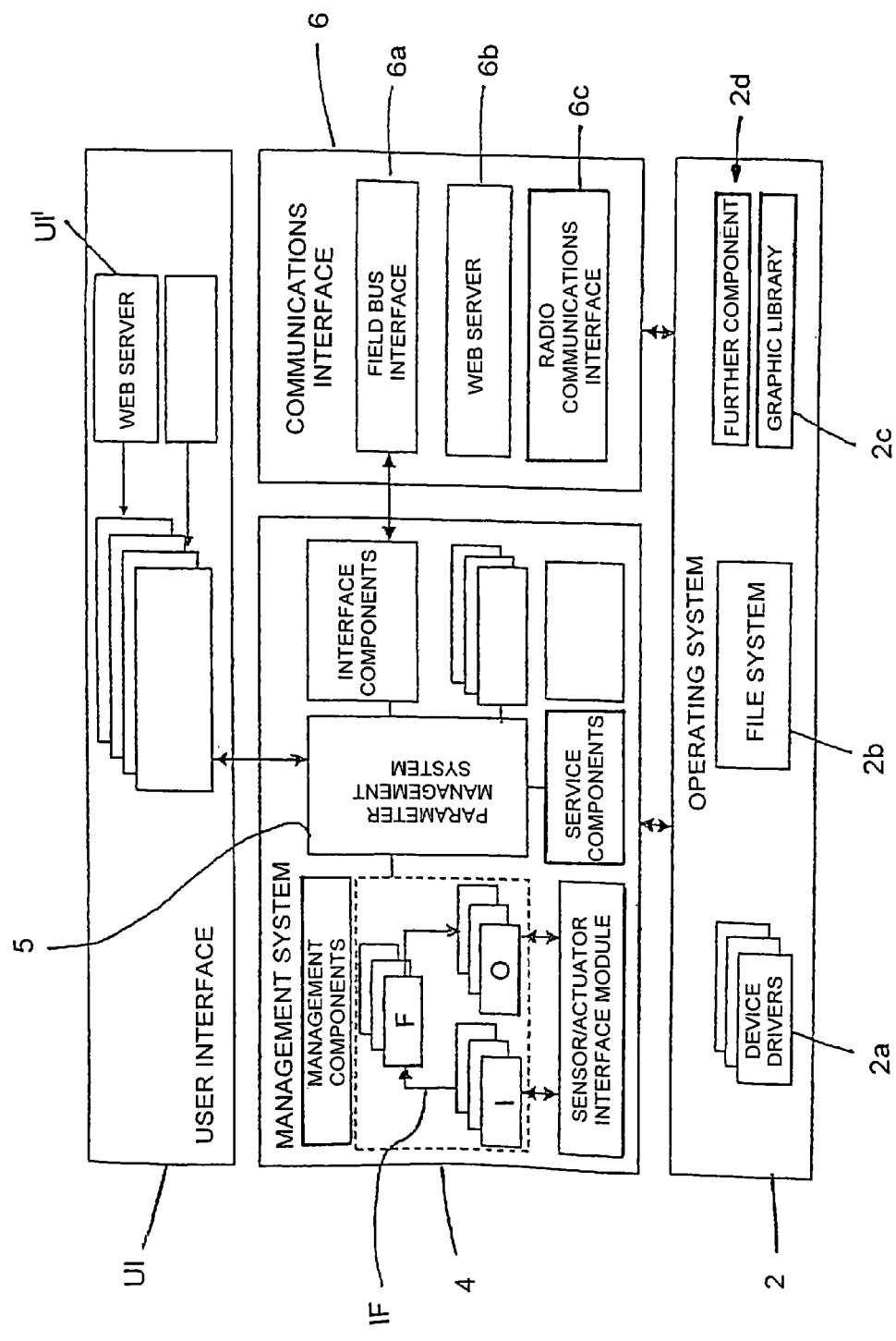
FIG. 1 is a schematic drawing of the central computer of a measuring device of the invention.

The central computer 1 has an operating system 2, which provides services to application programs running on the central computer 1 and enables access to hardware components of the central computer 1. For this purpose, the operating system 2 has, among other things, device drivers 2a, a file system 2b, a graphics library 2c, as well as further components 2d.

The functionality of the file system 2b can also be contained in a memory management system of the operating system 2.

The operating system 2 controls the running of processes on the central computer 1 and furnishes a memory management. Services of the operating system 2 manage timers, standard functions for activating interfaces and other frequently needed functions.

Additionally, the central computer 1 has a communications interface 6, which, besides a so-called "embedded web-server", thus an integrated web-server 6b, also includes a field bus interface 6a and a radio communications interface 6c, which works according to the de facto standard, Bluetooth. The radio communications interface 6c can also be formed such that it is compatible with a GSM mobile radio communications system. The field bus interface 6a can also be constructed as a Profibus, HART, or FOUNDATION field bus interface.

The communications interface 6 enables the exchange of data with other measuring devices or utilizing devices. For example, it is possible to transmit process data and recorded sensor data of the measuring device wirelessly to a notebook computer provided for a further evaluation of the process, or sensor, data.

Finally, the central computer 1 also has a user interface UI. The user interface UI has a so-called "touch panel" as output component, i.e. a touch-sensitive, liquid crystal display (not shown), which is provided for the output of process data and operating parameters of the measuring device.

Integrated in the user interface UI is a Web browser UI', which displays data delivered in HTML (hypertext markup language) format by the integrated Web server 6b of the communications interface 6.

The central computer 1 also includes a management system 4, which, similarly to the operating system 2, is stored in its own, reserved area of the program memory of the central computer 1. The program memory of the central computer 1 is in the form of FLASH/EEPROM memory.

The management system 4 manages quite generally, dynamically, system components of the measuring device, including input components I, output components O, functional components F, service components D, management components V and interface components IX.

The system components I, O, IX are software representations of hardware components, which are either already contained in the central computer 1 or are connected thereto.

Here, the input components I represent hardware components serving for data input. Such hardware components are sensors of all kinds, as well as digital and analog inputs of the central computer, as well as other possible sources of data.

The output components O represent, accordingly, hardware components serving for data output, thus e.g. actors, or actuators, and digital and analog outputs, which can also be connected via a serial interface.

The interface components IX usually represent the interface hardware present in the central computer 1.

The functional components F, the service components D and the management components V represent functional units of program code executable on the central computer 1. In contrast to the system components I, O, IX, these functional units do not contain program code for activating hardware components, such as sensors and the like, although exceptions to this are conceivable.

Here, the functional components F enable the implementing of e.g. mathematical functions and the processing of data quite generally. Also state automata can be realized with the functional components F. Additionally, also user-specific functions can be implemented, which are established on the basis of specifications.

The service components D utilize services furnished by the operating system 2, such as e.g. a timer service or the like. Beyond this, the service components D can also contain special program code for activating components of the central computer 1, for whose use the operating system 2 lacks appropriate services.

The management components V allow managing, or control, of the execution of application programs on the central computer 1. It is possible therewith to invoke application programs contained in the program memory of the central computer also from functional components F or other system components. This is especially of great advantage, when application programs need to be invoked in reaction to a sensor signal or an event being processed inside of the system components.

All system components I, O, F, D, V, IX are implemented in the form of code-modules, which are program code which can run on the central computer 1.

The code modules are usually stored in the program memory of the central computer 1. It is also possible to transmit code modules into the central computer 1 during operation of the measuring device, in order, in this way, to provide new system components. Such a transmission can occur, for example, over the communications interface 6, so that code modules are transferable to the measuring device of the invention from other measuring devices or from additional devices, such as e.g. PC's of a control station or directly from the manufacturer of the measuring device, or from providers of user-specific functional components.

The management system 4 can connect separate system components with one another, as will be explained below in more detail on the basis of FIG. 1. In the management system 4, the input component I is connected with the functional component F. This is indicated graphically by the arrow IF. The realizing of this connection by programming occurs in a plurality of steps.

In the first step, an instantiation of the code module to be used for the input component I occurs, whereby a new instance of the code module is created, which is assigned to the input component I. This new instance possesses the functionality of the selected code module.

Additionally, the new instance is temporarily given an area in memory, which can be used for the data processing within the input component I. A further memory area in the form of a stack memory is given to the input component I for data exchange with other system components. Also this further memory area is preferably reserved only temporarily, for the lifetime of the input component I. This has the advantage that the temporarily reserved memory can be used otherwise following termination of the instance assigned to the input component I, for example for other instances.

As indicated in FIG. 1, it is possible to produce plural instances of a code module. Each instance then requires a stack memory and, if need be, a memory area for the component-internal data processing. The program code of the code module itself is, however, present only as one copy in the program memory and is processed upon the invoking of each of the three instances. The management system 4 manages, in this case, the stack memories and the memory areas for the data exchange of the separate instances, so that each instance of the code module can access the memory assigned to it, or to the respective input component I.

In the present case, each of the three input components I is assigned to a channel of the sensor/actuator interface module SA.

The instantiation of other code modules occurs in the same way. As shown in FIG. 1, the central computer 1 has, in each case, three instances of the functional component F and three of the output component I.

Following the instantiation of a code module, the input component I is assigned a stack memory for the data exchange with other system components. According to FIG. 1, the input component I is connected with an input of the functional component F; see the arrow IF. By this connection, it is established in the management system 4 that the input component I shares a stack memory with the functional component F, so that the functional component F, for example, can read out, and further process, data written by the input component I into the shared stack memory.

Analogously thereto, the output of the functional component F is connected with the output component O. The functional component implements in the present case a lowpass filter, so that the lowpass-filtered data of the input component I are fed to the output component O.

The output component O finally is assigned a code module that activates a D/A-converter connected to the central computer 1.

The further instances of the input/output and functional components I, O, F are connected together in analogous manner.

As a whole, the management system 4 manages the contexts, i.e. the memory areas and stack memories temporarily assigned to the instances, and the information, via the connection of the instances with one another. The management occurs dynamically, so that system components can be connected and/or separated even during operation of the central computer 1, or at least then, when an application program is already to be found in the central computer 1.

For managing the contexts, the management system 4 has means for error recognition and/or error handling, which e.g. monitor the availability of memory areas or the utilization of the system components.

In the case of the present measuring device, also interface components IX can be used, with the corresponding code modules having interface-specific program code, in order e.g. to control the hardware interfaces of the central computer 1. The interface component IX of the central computer 1 is used in this case for activating the field bus interface 6a.

For the data transfer between the interface component IX of the management system 4 and the communication interface 6, a dual-port RAM memory is provided, which can be read out of, and written into, simultaneously by the interface component IX and the communication interface 6. Access control occurs using semaphores, thus variables which regulate exclusive access of the interface component, or the communications interface 6, to the dual-port RAM memory, in order to assure data consistency in the memory.

The service component D makes the services of the operating system 2 available to the system components, or to their instances, connected with it.

Beyond this, the management system 4 has a parameter management system 5, wherein the system components, or their instances, record their parameters. System 5 manages all parameters of the system components. Especially, dependencies between parameters in various system components, or instances, are resolved by the parameter management system 5.

Especially advantageous in the measuring device is the possibility of being able to change information via the connection of system components during operation of the measuring device, or central computer 1, and to be able to transmit system components into the central computer 1 during operation, this being made possible by the dynamic management of the system components by the management system 4.

In order, for example, to integrate a user-defined filter function into the measuring device, a code-module is first developed using appropriate guidelines. The code-module implements the user-defined filter function. The code-module is then transferred into the program memory of the central computer as functional component F'. Now, the user-defined, system component F' transferred into the central computer can be connected by the management system 4 with other system components.

The system components are, in general, cyclically executed, for example with a cycle time, or period, which is given by a timer of the operating system 2. Additionally, it is possible to invoke system components acyclically directly from the presently running program code e.g. of an application program.

Conversely, it is also possible from a system component, as already mentioned, to invoke an application program or to utilize callback mechanisms provided therein.

Especially advantageous is also the possibility of specifying system components using a development environment provided therefor, for example, on a PC. Especially in the case of functional components, it is possible to use, quite generally, already existing description languages of widely accepted symbol manipulation programs, such as e.g. "Mathematica", "Matlab" or "Maple", or also data from simulation programs, such as e.g. "SimuLink", for the specification of the functional component itself, or its description within the development environment.

Very expedient, in such case, is also the possibility of building functional components from function portions already existing in function libraries.

Likewise is it possible to develop, on a development system for system components, entire libraries of system components, which can be selected as needed and transferred into an appropriate measuring device.

Beyond this, it can be very advantageous to simulate the interactions of individual system components in the development system, before transferring these system components into the measuring device. In this way, malfunctions during operation of the measuring device in the field can be prevented.

For this purpose, the individual system components are already connectable with one another in the development system. In so far as all system components required for a desired functionality are already present in the central computer 1 of the measuring device, it is sufficient, following the simulation, then just to transfer the information about the interconnections of the individual system components into the central computer 1. The information is stored in a memory area of the central computer 1 provided therefor and, for example, reviewed periodically by the management system 4 for its validity, or consistency. It is also possible to evaluate this information automatically upon start-up of the measuring device.

A change of the functionality of the measuring device can always be made in the field by transferring new system components, or information about connections, into the central computer 1. In particular, no knowledge about the program structure of the central computer 1 is required, so that re-configuration of the measuring device of the invention can be delegated to assistants.

It is also possible that information about the connection of system components or also system components themselves can be transferred directly from a first measuring device to a second measuring device.

The invention claimed is:

1. A measuring device for process technology, useful in at least one of: measuring, cleaning, calibration-installations in the field of process automation for measuring at least one of: pH-values, redox potentials and other process parameters, having:
   at least one central unit, which has at least one central computer; and
   a management system provided in said central computer for the dynamic management of at least one of: input components (I), output components (O), functional components (F), service components (D), management components (V), interface components (IX), and other system components, wherein:
   said management system can adopt the functionality of the measuring device; and said components are program code.

2. The measuring and/or control and/or regulating device as claimed in claim 1, wherein:
   the execution of application programs on said central computer can be managed from said management system.

3. The measuring device as claimed in claim 1, wherein:
   said management system includes a parameter management system.

4. The measuring device as claimed in claim 1, wherein:
   said management system includes means for error recognition and/or error handling.

5. The measuring device as claimed in claim 1, wherein:
   in said central computer, a communications interface is provided, which interacts with said interface component (IX).

6. The measuring device as claimed in claim 1, wherein:
   a user interface (UI) is provided.

7. The measuring device as claimed in claim 5, wherein:
   said communications interface includes a field bus, Profibus, HART or FOUNDATION field bus interface.

8. The measuring device as claimed in claim 5, wherein:
   said communications interface includes an integrated Web sewer.

9. The measuring device as claimed in claim 1, wherein said user interface (UI) includes a web browser.

10. An operating method for a measuring device for process technology, useful in at least one of: measuring cleaning and calibration-installations in the field of process automation for measuring at least one of: pH-values, redox potentials and other process parameters, with at least one central unit, which has at least one central computer, comprising the steps of:
    providing in the central computer a management system which dynamically manages at least one of:
    input components (I), output components (O), functional components (F), service components (D), management components (V), interface components (IX), and other system components, wherein:
    said management stem can adopt the functionality of the measuring device: and
    said components are program code.

11. The operating method as claimed in claim 10, further comprising the step of:
    specifying and/or selecting and/or configuring and/or connecting the system components, preferably with the help of a development environment together, before they are transferred into the central computer.

12. The operating method as claimed in claim 10, further comprising the step of at least one of:
    transferring into the central computer during operation of the measuring devices, the system components, and the system components being bound-in by the management system.

13. The operating method as claimed in claim 10, wherein:
    system components are bound-in permanently into the central computer and, for configuring the measuring device, information about the connection of the system components is utilized by the management system.

14. The operating method as claimed in claim 13, wherein:
    the connection of the system components is obtained with the help of a development environment preferably outside of the central computer.

15. The operating method as claimed in claim 13, wherein:
    the information about the binding/connection of the system components is transferred from a first measuring device to further measuring devices.

* * * * *